Nov. 30, 1948.  M. M. CLAYTON  2,455,231
ELECTRICAL RACEWAY
Filed Aug. 17, 1945  2 Sheets-Sheet 1
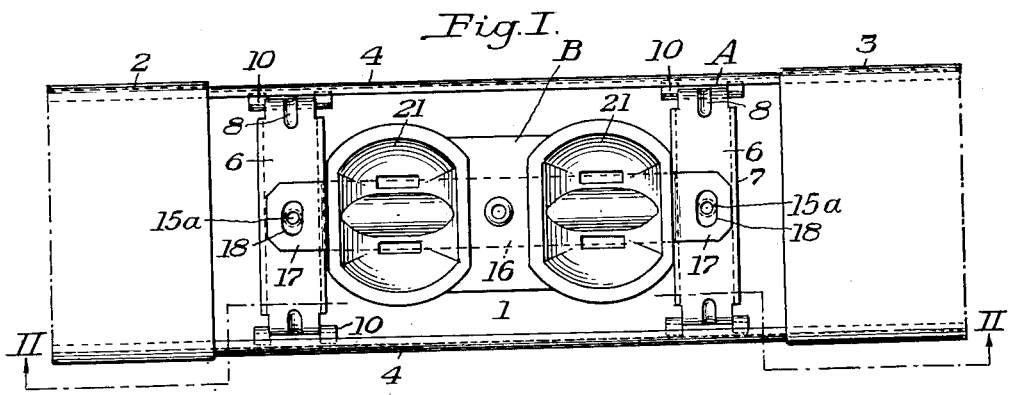
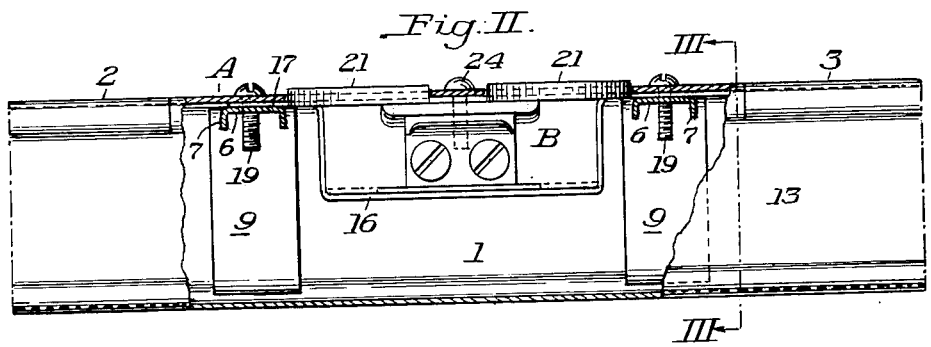
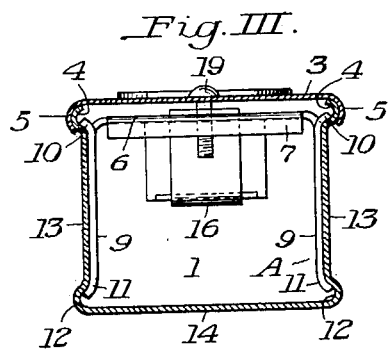
INVENTOR
Martin M. Clayton
by William B. Wharton
his attorney Nov. 30, 1948. M. M. CLAYTON 2,455,231
ELECTRICAL RACEWAY
Filed Aug. 17, 1945 2 Sheets-Sheet 2
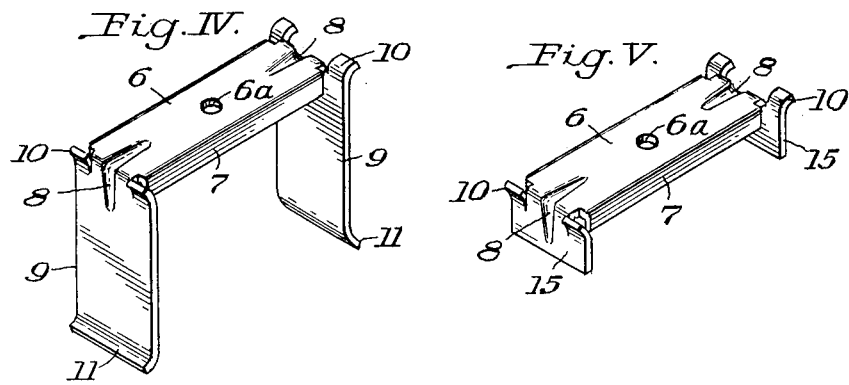
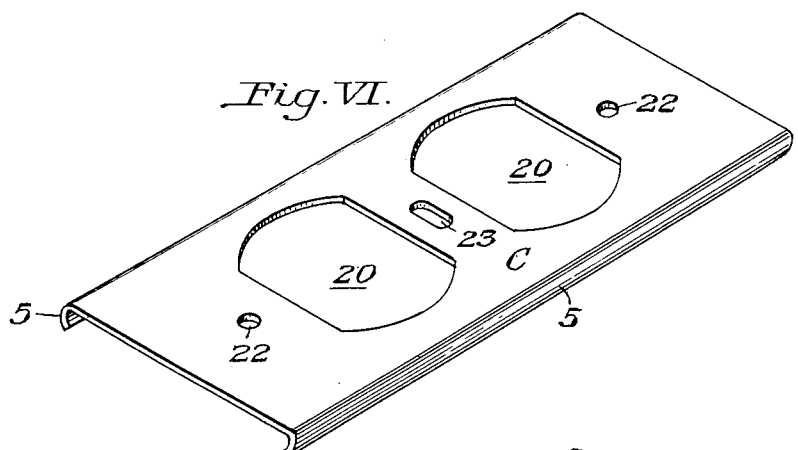
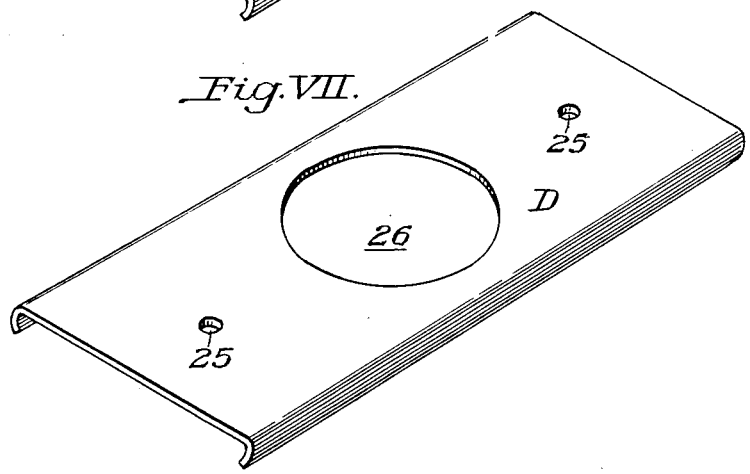
INVENTOR
Martin M. Clayton
by William B. Wharton
his attorney Patented Nov. 30, 1948

2,455,231

UNITED STATES PATENT OFFICE 2,455,231

ELECTRICAL RACEWAY

Martin M. Clayton, Enon Valley, Pa., assignor to National Electric Products Corporation, Pittsburgh, Pa., a corporation of Delaware Application August 17, 1945, Serial No. 610,977

4 Claims. (Cl. 174—101)

This invention relates to an electrical device raceway; that is, to raceways in which devices are installed for making contact between appliances and an electrical circuit housed in the raceway.

In the wiring of buildings, device raceways, or flush wiring systems, which provide for the electrical connection of appliances at a multiplicity of points are finding increased favor. There are, however, a number of problems involved in the production of such raceways. Device raceways, or multiple outlet ducts which are formed in completed lengths by standardized factory procedure, are inconvenient in use because of the fact that a large number of standard lengths, including elbows and the like, must be provided in order to conform to various contours and requirements of the rooms in which the raceway is installed. They are inflexible also in the positioning of the devices giving access to the circuits which they house.

Because of lack of flexibility in factory completed device raceways, or multiple outlet ducts, there is an increasing tendency so to make such raceways that devices may be positioned at will along their length as the raceway is installed. Such raceways also, present problems. When those raceways are adapted to the installation of special devices, such devices lacking universality are difficult to obtain for installation, and frequently require specialized and troublesome operations in their manufacture. If on the other hand the raceways be constructed to use standard outlet devices, it has been necessary to make the raceway of unusually great size in order to accommodate both the mounting elements for the devices and the circuit wires by connection to which the devices are energized. In either instance difficulty has been encountered in mounting the cover, or capping, of the raceway, and it has been necessary to use additional and inconvenient elements to secure the capping to the channel, or body, of the raceway.

A primary object of my invention is to provide a device raceway in which the raceway may be cut to any desired length in the field and the devices mounted in any desired spacing along its length, which raceway possesses the advantageous feature of providing mounting for devices of standard form in available position therein by mounting means which do not obstruct the wiring space within the channel, or body, of the raceway.

Another primary object of my invention is to provide a raceway in which the cover or capping structure of the raceway assembly is secured to the channel, or body, of the raceway by simple means contained within the bounds of the channel and cover, and which do not obstruct the wiring space within the channel, or body, of the raceway.

A general object of my invention is to provide a device raceway which in its assembled condition is unusually stiff and rigid, being protected against deformation under forces to which it may be normally subjected in service, and in which the devices are firmly and stiffly supported for the making and breaking of electrical connection with them.

A further object of my invention is to provide all of the above advantages in simple manner by the addition to the assembly of the raceway of an element which is of uncomplicated structure, and which may be readily applied to the other elements of the raceway either in factory assembly or in the field.

Other advantageous features incidental to the attainment of the above-noted objects of my invention will hereinafter appear.

In the accompanying drawings exemplary of the preferred embodiment of my invention:

Fig. I is a plan view of a short length of device raceway in accordance with my invention, a portion of the cover, or capping of the raceway at the region occupied by a duplex device being omitted to expose the interior structure of the assembly.

Fig. II is a view of the length of the device raceway shown in Fig. I taken partly in elevation and partly in longitudinal section in the plane of the section line II—II of Fig. I.

Fig. III is a cross-sectional view through the raceway asembly taken in the plane of the section line III—III of Fig. II.

Fig. IV is a perspective view of a preferred form of a bridge which is shown as an effective element of the raceway assembly in the preceding figures of the drawings.

Fig. V is a perspective view showing the preferred form of my bridge modified by simplification of the structure of the bridge as shown in Fig. IV.

Fig. VI is a perspective view of a cover, or capping, section of the raceway prepared for mounting on the channel, or body structure thereof in position effectively to expose the sockets of a duplex device, this cover section corresponding therefore to the section of cover which is omitted in Figs. I and II of the drawings.

Fig. VII is a perspective view of a cover section analogous to that shown in Fig. I and arranged to give access to a single outlet device, a switch, or the like functional element of the device raceway.

In the drawings reference numeral 1 designates the channel, or body, or the raceway, which is composed of resilient metal or other suitable resilient material; and reference numerals 2 and 3 designate respectively the cover sections therefor as they appear in Figs. I to III inclusive of the drawings. As shown, channel, or body member 1 of the raceway has at the upper end of the sidewalls aligned outward bows, in the form of concavo-convex beads 4 which engage with reversely curved, or hooked, shallow sidewalls 5 formed as dependent flanges along the edges of the cover 3. This formation along the upper edges of the channel sidewalls and in the dependent flanges of the cover tends to provide resilient engagement between channel 1 and each of the similarly formed cover sections. In practice, however, such primarily resilient engagement between the channel and cover of a raceway is of itself inadequate mutually to secure the channel and the cover. Such resilient engagement presumes that the sidewalls of the channel accurately preserve their original form and resiliency. In practice they do not do so, but become in service so deformed that the resilient engagement of the cover and the channel is lost.

This problem and various other problems connected with the organization of a device raceway of the desired sort I have solved by use of an interiorly disposed bridge. I have found that by preserving accurate spacing of the channel sidewalls in the region in which those sidewalls are engaged by the cover section, or sections, the cover remains firmly engaged to the channel of the raceway. This accurate cross-sectional form of the raceway is maintained not only in installation, but under all the normally anticipated conditions of continued service when installed.

Referring now particularly to Fig. IV of the drawings, showing the more elaborate form of my preferred bridge structure, and to the mounted assembly of that bridge structure in the raceway as shown in Figs. I, II and III of the drawings, the bridge primarily is a simple, rigid, transverse spreader member 6 of a length to extend between the cavities formed interiorly by beads 4 at the upper ends of the channel sidewalls, and very slightly to force those walls outwardly. Desirably as shown, this member 6 is stiffened in its formation by short dependent longitudinally extended flanges 7, and by longitudinally extended formed indentations 8 which embrace the junction between the spreader member 6 and the legs 9 which depend from it. Secure locking engagement with the beads 4 of the channel sidewalls is provided by hooked ears 10 which project longitudinally of the spreader member 6 at the junction of the spreader member and its legs 9. Fig. III of the drawings shows the hooked engagement of these ears 10 with the cavity of bead 4. Fig. IV of the drawings shows legs 9 of the bridge relatively elongate and outwardly deflected, or hooked, at their lower terminals 11 to engage in concavo-convex beads 12 at the junction of sidewalls 13 and bottom 14 of the channel.

In Fig. V of the drawings the structure of the bridge is identical with that shown in Fig. IV, save that the sidewalls 15 of this modified form of bridge are abbreviated comparatively with the sidewalls 9 of the bridge shown in Fig. IV, terminating as shown at the lower end of the stiffening indentation 8 which embraces the junction of spreader member 6 and the sidewalls. In practice I have found that the downward extension of the legs from the ends of the spreader member serve a useful purpose, but one that is not usually requisite, by providing additional engagement between the bridge and the channel of the raceway.

It readily will be understood that when positioned as shown in Figs. I to III of the drawings, the bridges designated generally by reference letter A in those figures of the drawings accurately space the sidewalls 13 of the channel, preventing each sidewall either from collapsing inwardly or bulging outwardly. By this accurate spacing the resilient interlocked engagement of the cover section, or sections, with the channel of the raceway is firmly maintained. A plurality of the bridges placed at intervals along the channel of the raceway give a raceway structure which is of great rigidity even when manufactured in extended lengths; and this is particularly the case when, as is desirable, the spreading effect of the bridges at the upper end of the channel walls is exerted cooperatively with the stiffening effect of concavo-convex beads formed at the base of the channel. The function of the bridges A in mounting receptacles in the raceway is an advantage of primary importance.

It will be seen in Figs. IV and V that the spreader members 6 of the bridges are provided with tapped screw holes 6a for engagement of the cover sections with the bridges, and for mounting of receptacles in the raceway. Thus in the assembly views of the drawings, a duplex device B is shown as provided with a saddle 16 which passes longitudinally beneath the body of the device and upwardly along and outwardly from its ends, to provide longitudinally extended attachment ears 17. In assembly two of the bridges A are brought into such position in the channel of the raceway that the screw holes 6a in the spreader members 6 match with holes 18 in the ears of the saddle, so that screws 19 may be used to engage the device in direct mounted position on the bridges.

With this mounting of the duplex device B, a cover section, such as the cover section C, is brought into position on the raceway with its hooked sidewalls 5 engaged with beads 4 of the channel walls between which bridges A extend. This cover section C, which is appropriate to that particular location, has therein cut-outs 20 which expose the socket elements 21 of device B; and has holes 22 for the passage of screws 19 which engage mounting ears 17 of the device to the bridges. An additional opening 23 may be placed between cut-outs 20 for the passage of an additional screw 24 interengaging the cover and the device. The cover section D shown in Fig. VI of the drawings has therein holes 25 for the passage of screw shanks and the engagement of the cover with two bridges. As shown, this cover section has a circular cut-out 26 for the protection of a switch, single-outlet device, or other suitable element of the assembly. It is to be understood that the cover sections may be made in any suitable length; and that some sections may be uninterrupted by openings to give access to elements of the assembly, but all cover sections as originally manufactured, or as prepared for use desirably are provided with one or more holes for the passage of screws by which they are engaged with the bridges standing in the raceway.

Obviously the devices used in completing the raceway assembly may be of any standard form and manufacture, it being necessary merely to apply saddles to them in order to provide for their mounted attachment to the spaced bridges in the channel of the raceway. The raceway assembly may, if desired, be completed in the factory. It is, however, usual and desirable practice commercially to provide the elements in unassembled condition and to make the assembly in accordance with the conditions of the installation, cutting the lengths of raceway and cover, and placing the bridges and the devices in accordance with the size and contour of rooms in which the raceway is installed and the desired arrangement of outlets with respect to anticipated requirements. To such assembly and installation the raceway of my invention is peculiarly adapted. It may be noted as an incidental advantage of the bridges, that in making assembly of the raceway and in preparing for its installation, wires are held by the bridges against falling from the channel of the raceway before the devices and cover are mounted.

When the assembly is made, the bridges take the thrust and pull of inserting the prongs of attachment plugs into the sockets of devices mounted in the raceway, and of withdrawing those prongs from contact-making engagement. Such forces, therefore, do not tend to deform either the channel or the cover of the raceway, and contact making and breaking is facilitated by the firm backing for the devices afforded by the bridges on which they are mounted. It has been noted that the extension of the bridges into the bowed cavities lying along the upper ends of the channel sidewalls and within the bowed or hooked walls of the cover, preserve firm resilient engagement of the cover with the channel. This is in measure true even if the bridges be less specialized than the preferred forms of bridge shown in Figs. IV and V.

The bridge structure shown in those figures of the drawings does, however, give particularly great assurance against unintentional removal of the cover. A pull exerted on the cover tending to detach it from the channel of the raceway, if of sufficient severity serves to bend downwardly the upwardly and outwardly extended ears 10 of the bridges. This effect serves to increase the effective spread of the ears transversely of the raceway, and thus to press the beads of the raceway walls more firmly against their matching bows in the sidewalls of the cover. A particularly severe pull on a cover section, by causing the ears to bend somewhat downwardly exerts an effective resilient force along the lower edges of the matching concavo-convex bows of the channel sidewalls and the cover.

In a completed assembly the engagement between the channel and the cover is so secure that in actual test forces of over 300 lbs. have been applied in a direct pull on the cover of the raceway without disturbing its engagement with the channel. In fact I have found that the cover remains in place under such detaching forces up to a point at which the channel of the raceway is bodily deformed before the cover is pulled from the raceway.

Having exemplified the preferred embodiment of my invention it is to be understood that the invention is not limited to the specific form and arrangement of elements shown and described in disclosing such embodiment, but that the scope of my invention embraces all such changes in the form and arrangement of the several elements as shown and described herein as may fall fairly within the bounds of the claims appended hereto.

I claim as my invention.

1. In an electrical raceway the combination of a channel member having yielding sidewalls provided adjacent their upper ends with outwardly bowed regions, a relatively rigid bridge structure comprising a transverse spreader member spanning across the channel within the said channel member at the outwardly bowed regions thereof and hooked ears projecting outwardly from the ends of said spreader member and interlockingly engaged with the said outwardly bowed regions in the sidewalls of the channel member, a cover structure having side members arranged embracingly and resiliently to engage the said channel member at the regions thereof inwardly supported by said bridge, and an electrical device supportingly engaged by said bridge.

2. In an electrical raceway the combination of a channel member having yielding sidewalls provided adjacent their upper ends with outwardly bowed regions, a relatively rigid bridge comprising a transverse spreader member spanning across the channel within the said channel member at the outwardly bowed regions thereof and hooked ears projecting outwardly from the ends of said spreader member and interlockingly engaged with the said outwardly bowed regions in the sidewalls of the channel member, and a cover structure having side members arranged embracingly and resiliently to engage the said channel member at the regions thereof inwardly supported by said bridges.

3. In an electrical raceway the combination of a channel member having yielding sidewalls provided adjacent their upper ends with outwardly bowed regions, a relatively rigid bridge structure comprising a transverse spreader member spanning across the channel within the said channel member at the outwardly bowed regions in the sidewalls thereof and engaging members extended from the ends of said spreader member angularly toward the open face of said channel and interlockingly engaged with the said outwardly bowed regions in the sidewalls of the channel member, and a cover structure having side members arranged embracingly and resiliently to engage the said channel member at the regions thereof inwardly supported by said bridge.

4. In an electrical raceway the combination of a channel member having yielding sidewalls provided adjacent their upper ends with outwardly bowed regions, a relatively rigid bridge structure comprising a transverse spreader member spanning across the channel within the said channel member at the outwardly bowed regions in the sidewalls thereof and engaging members extended from the ends of said spreader member angularly toward the open face of said channel and interlockingly engaged with the said outwardly bowed regions in the sidewalls of the channel member, a cover structure having side members arranged embracingly and resiliently to engage the said channel member at the regions thereof inwardly supported by said bridge, and an electrical device supportingly engaged by said bridge.

MARTIN M. CLAYTON.

REFERENCES CITED

The following references are of record in the file of this patent:

UNITED STATES PATENTS

| Number | Name | Date |
|---|---|---|
| 1,106,103 | Lutz | Aug. 4, 1914 |
| 2,090,239 | Strang | Aug. 17, 1937 |
| 2,136,583 | Corbett | Nov. 15, 1938 |
| 2,250,276 | Rutherford | July 22, 1941 |
| 2,299,153 | LaDucer | Oct. 20, 1942 |

FOREIGN PATENTS

| Number | Country | Date |
|---|---|---|
| 577,610 | Germany | Jan. 23, 1930 |